(12) United States Patent
Fischer

(10) Patent No.: US 6,321,155 B1
(45) Date of Patent: Nov. 20, 2001

(54) METHOD AND APPARATUS FOR AN AUTOMATIC BRAKE INTERVENTION CONTROL AND CONTROL DEVICE

(75) Inventor: Gerhard Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/671,155

(22) Filed: Sep. 28, 2000

(30) Foreign Application Priority Data

Sep. 28, 1999 (DE) .............................................. 199 46 463

(51) Int. Cl.[7] .......................... B60G 17/00; B60G 17/015
(52) U.S. Cl. ........................... 701/89; 280/707; 280/840; 280/688; 361/240; 324/160; 180/902; 180/142
(58) Field of Search ................................. 701/89, 20, 37; 73/105; 280/107, 840

(56) References Cited

U.S. PATENT DOCUMENTS

| | | | |
|---|---|---|---|
| 5,229,955 | * | 7/1993 | Nishiwaki et al. .................... 73/105 |
| 5,444,621 | * | 8/1995 | Matsunaga et al. ................... 701/41 |
| 5,619,413 | * | 4/1997 | Oakley .................................. 703/37 |
| 5,822,709 | * | 10/1998 | Fujita ................................... 701/70 |
| 5,947,221 | * | 9/1999 | Taniguchi et al. ................... 180/197 |

FOREIGN PATENT DOCUMENTS 35 34 211 A    9/1985  (DE) .

* cited by examiner

*Primary Examiner*—William A. Cuchlinski, Jr.
*Assistant Examiner*—Tuan C To
(74) *Attorney, Agent, or Firm*—Crowell & Moring LLP

(57) ABSTRACT

A system for an automatic brake intervention control in an all-wheel-drive vehicle having an automatic brake control system, comprises a control device and separately actuatable brakes which are assigned to the individual wheels. The control device generates signals to control individual brakes as a function of wheel compression and rebounding travels or the wheel reaction forces detected at the individual wheels. Wheel signals are generated which correspond to the wheel suspension travels, the wheel reaction forces or quantities derived therefrom, and the wheel signals are supplied to the control device. The control device generates the signals for controlling the individual brakes at least as a function of the individual wheel signals present as input information.

11 Claims, 3 Drawing Sheets

METHOD AND APPARATUS FOR AN AUTOMATIC BRAKE INTERVENTION CONTROL AND CONTROL DEVICE

BACKGROUND AND SUMMARY OF THE INVENTION

This application claims the priority of German patent document 199 46 463.4, filed Sep. 28, 1999, the disclosure of which is expressly incorporated by reference herein.

The invention relates to a method and apparatus for automatic brake intervention control in an all-wheel-drive vehicle.

Automatic brake control systems are generally known and are used more and more frequently for improving driving safety and driving dynamics. A special problem concerning driving dynamics occurs, however, when such controls are included in all-wheel-drive vehicles. Specifically in rough terrain, individual wheels or several wheels may lose contact with the ground, to varying degrees. As a result increased wheel slip occurs at those wheels which lose contact, reducing traction, specifically during extreme uphill or downhill driving. This, in turn, impairs driving safety.

Previous automatic brake control systems have attempted to solve this problem by performing a brake intervention if an increased slip was detected at a wheel. However, this approach has the disadvantage that, in the case of an increased slip, particularly during uphill or downhill driving, traction is already reduced, so that the brake intervention is often too late.

One object of the present invention is to provide a method and apparatus of the initially mentioned type which ensures essentially a continuously optimal traction in the case of all-wheel-drive vehicles and also in rough terrain.

This and other objects and advantages are achieved by the automatic braking control according to the invention, in which wheel compression and wheel rebound movements (herein, generally called "wheel suspension travels"), the wheel reaction forces or values derived from the above-mentioned quantities, (such as the corresponding rebounding and force rates) supply information concerning the ground adherence of a particular wheel. By detecting and analyzing these quantities, a conclusion can be drawn concerning the ground adherence of an individual wheel or the development of the ground adherence. The latter quantity, in turn, allows a prediction concerning slip which is to be expected. If the slip to be expected is above a certain limit value, a brake intervention can be implemented, even though the actual slip at each individual wheel has not yet exceeded a critical value. Such brake intervention before or simultaneously with the occurrence of a critical slip value at a wheel ensures continuous traction, so that a safety gain is achieved.

The wheel suspension travels or the wheel reaction forces can be determined, for example, by means of sensors.

The wheel reaction forces can preferably also be determined from the wheel suspension travels. Sensors for the wheel suspension travels already exist in some vehicles so that their signals can also be used in a simple manner. If the signals already exist on a vehicle data bus and are provided by an existing automatic brake control device, no significant additional hardware is necessary in order to implement the method according to the invention. The invention thus provides a particularly cost-effective solution to the problem of wheel slip.

In order to draw a conclusion concerning the development of slip and ground adherence of an individual wheel, the compression and rebound rates or the time variations of the wheel reaction forces are of interest. These values can easily be determined from the wheel suspension travels and from the wheel reaction forces. In addition, input quantities which indicate uphill or downhill driving, or lateral acceleration can be supplied to the control device. When taking into account these quantities, a certain brake intervention can be determined according to the driving situation. In this case, interventions during uphill or downhill driving differ from those during cornering, circular driving or slalom driving. During circular driving or slalom driving, it is possible that both wheels of one vehicle side lift off, whereas, during uphill or downhill driving, either an individual wheel or diagonally arranged wheel may lose more or less ground contact. Corresponding to the driving situation and the other input information, such as steering angles, etc., automatic brake control strategies can be defined and filed in the control unit.

Other objects, advantages and novel features of the present invention will become apparent from the following detailed description of the invention when considered in conjunction with the accompanying drawings.

DETAILED DESCRIPTION OF THE DRAWINGS

Figure 1:
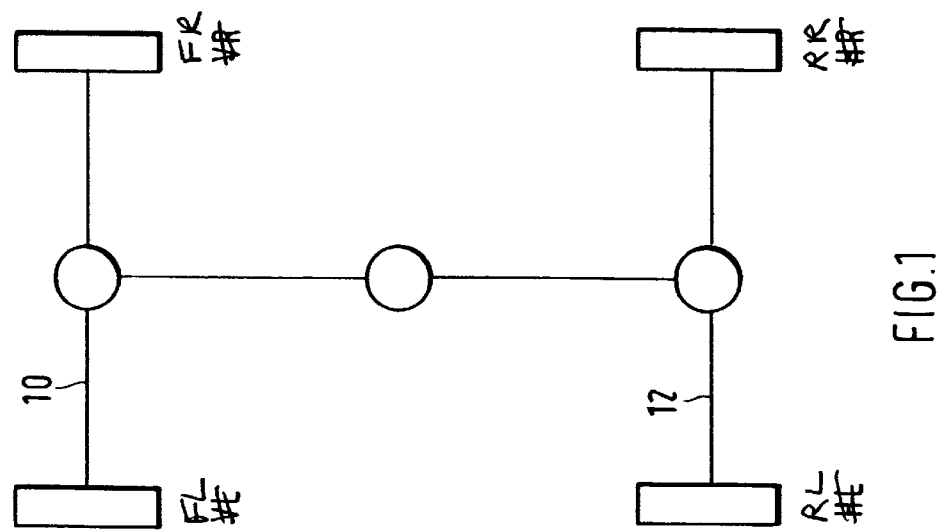
FIG. 1 is a schematic top view of a drive-connected front and rear axle of a cross-country vehicle.

FIG. 1 is a schematic representation of a drive-connected front axle 10 and rear axle 12 with the front wheels FL (=front left) and FR (=front right) and the rear wheels RL (=rear left) and RR (=rear right). Depending on the ground condition, for example during cross-country driving, the front axle 10 and/or the rear axle 12 may be twisted. In this case, depending on the twisting, the front wheels and/or the rear wheels are compressed or rebounded more or less extensively.

Figure 2:
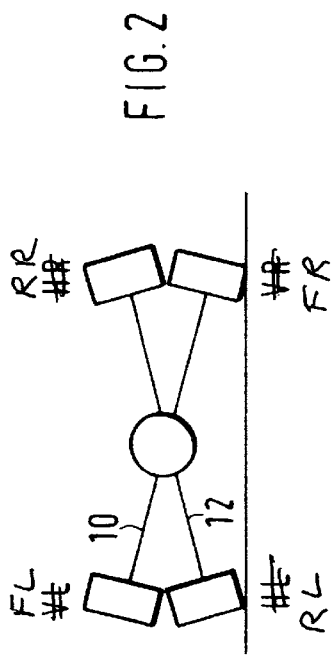
FIG. 2 is a schematic representation as in FIG. 1, but in the driving direction.

FIG. 2 is a schematic representation of the drive-connected front axle 10 and rear axle 12 of a cross-country vehicle according to FIG. 1 in the driving direction, in which the front axle 10 as well as the rear axle 12 are twisted (diagonal twisting). In this case, the wheels FR and RL have rebounded. The wheels FL and FR are compressed.

Specifically in the case of a diagonal twisting in the terrain during uphill or downhill driving, a loss of traction may occur which may be critical with respect to safety depending on the ground conditions and slope. Such a loss of traction should be prevented.

Figure 3:
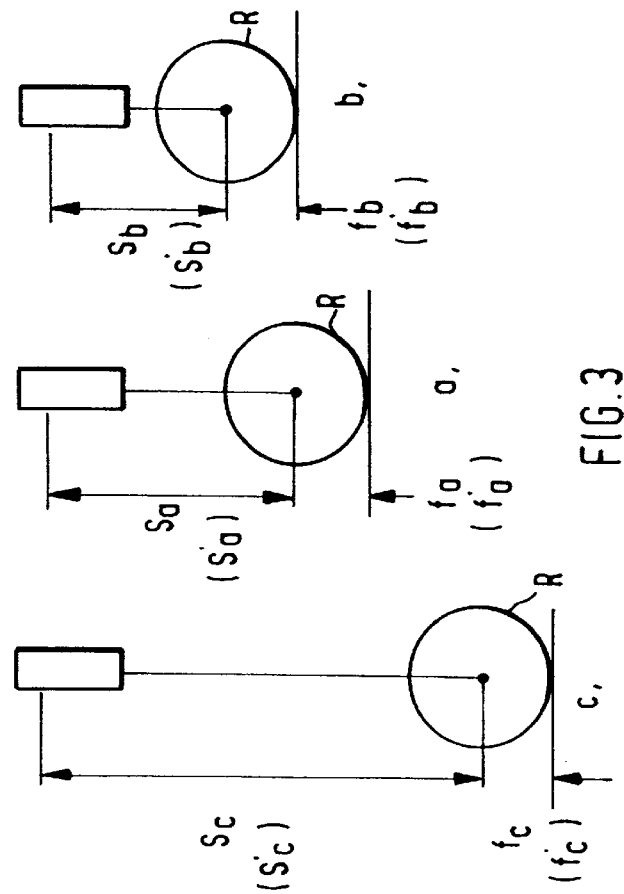
FIGS. 3a to 3b are schematic representations of wheels with different wheel rebound travels.

In a manner known per se, the spring travels are detected at the individual wheels by means of a spring travel sensor. FIGS. 3a to 3c show different wheel suspension travels $s_a$, $S_b$, $s_c$ for a wheel R; $S_a$ being the zero position; $S_b$ describing a compressed wheel; and $s_c$ describing a rebounded wheel. In addition, the spring rates $\dot{s}_a$, $\dot{s}_b$, $\dot{s}_c$, the wheel reaction forces $f_a$, $f_b$, $f_c$ (by way of $f=k*s_i$), and the wheel reaction force rates $\dot{f}_a$, $\dot{f}_b$, $\dot{f}_c$ (by way of $f=k*s$), wherein k is a spring constant, can be calculated from the wheel suspension travels.

Figure 4:
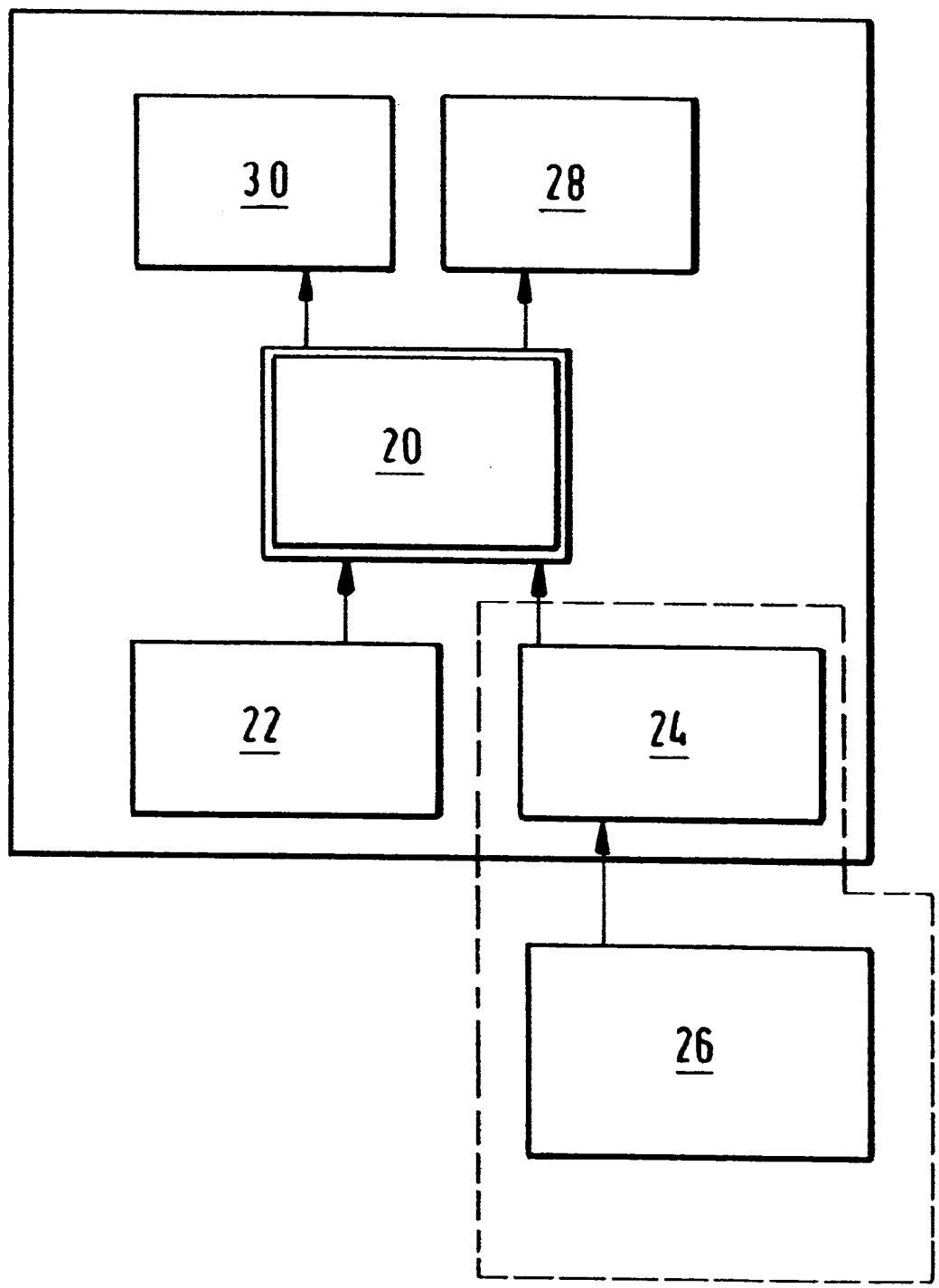
FIG. 4 is a block diagram of an embodiment of a control system according to the invention.

All this information can be used to influence brake control intervention for the brake unit of each wheel, via a brake control unit 20, as shown in FIG. 4. In the present case, a Dynamic Stability Control ("DSC") control unit can be used. Up to now, various input quantities, such as the steering angle, the brake pressure, the rotating rate, the wheel speed, etc., were supplied to this brake control unit 20. These quantities are usually determined directly by sensors (reference number 22) and are transmitted to the brake control unit 20.

In addition to the signals from these sensors 22, the wheel suspension travels $s_i$, the wheel suspension travel rates $\dot{s}_i$, the wheel reaction forces $f_i$ and the wheel reaction force rates $\dot{f}_i$, (wherein, in each case, i=1–4) are now also supplied as input quantities to the wheel control unit 20. In a manner described above, this information is obtained in a signal processing unit 24 from the wheel suspension travels $s_i$ (i=1, 2, 3, 4). The wheel suspension travels $s_i$, in turn, originate from sensors 26 at the individual wheels FL, FR, RL, RR.

From the input information available to it, brake control unit 20 determines not only a desired engine torque and influences the engine timing 28, but also determines the brake pressures for the individual wheel brakes Mb1–Mb4, which are then implemented in a conventional manner at the individual wheel brakes 30. The wheel brakes are controlled individually corresponding to the individually calculated wheel brake pressures and contribute to an improved traction, particularly during uphill and downhill driving.

Figure 5:
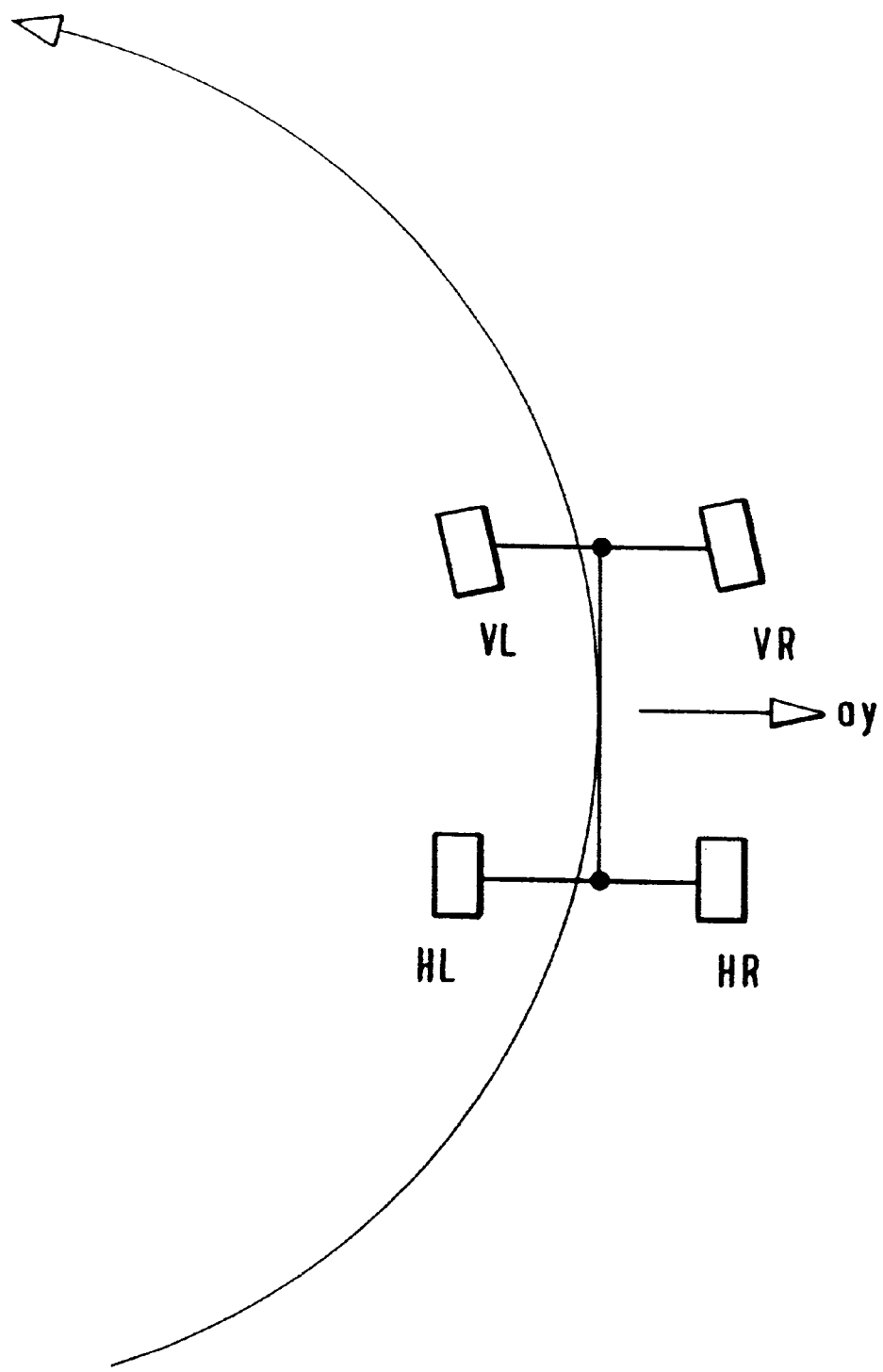
FIG. 5 is a schematic representation of a drive-connected front and rear axle of a cross-country vehicle during accelerated cornering.

However, traction can be improved not only during uphill and downhill driving, but also during cornering and slalom driving. FIG. 5 is a schematic view of a cornering operation, a circular acceleration which cause a centrifugal reaction force acting toward the outside. As a result, the wheels which are on the inside during cornering are relieved, so that a rebound takes place at these wheels. Simultaneously, the wheels which are on the outside during the cornering are stressed, so that a compression takes place at these wheels. At a certain cornering speed, which depends on various factors, the wheels on the inside during the cornering may lift off the road. In order to prevent this problem, an engine or brake intervention can be carried out on the basis of the suspension travels reported by the wheel sensors.

On the whole, by means of the information from the wheel suspension travels and their time variations or the wheel reaction forces and their time variations, additional control strategies can be carried out within the automatic brake control; that is, brake torque control and drive torque control can be carried out independently of conventional values, such as the wheel slip, the lateral acceleration, the rate of rotation and the steering angle. This results in an improvement of the traction by a preventive brake torque control and an improvement of the stability and an overturning prevention during circular driving and lane change maneuvers. An improvement of the engine braking torques can also be achieved by a targeted brake intervention of the lifting-off wheels during downhill driving.

In addition, by an analysis of the suspension travel frequency, the surface condition of the road can be determined and classified (for example, gravel or poor road). By means of this information, the conventional ABS/ASC slip thresholds can be increased correspondingly and higher braking performances and higher traction performances can be achieved on the specific roads.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling automatic braking in an all-wheel-drive vehicle having an automatic brake system comprising a control device and individual brake units which are assigned to respective vehicle wheels and are actuatable independently of one another, the control device generating signals for controlling the individual brakes as a function of input information, said method comprising:

detecting one of wheel suspension travels and wheel reaction forces at individual wheels;

generating wheel signals based on one of the wheel suspension travels, the wheel reaction forces and quantities derived therefrom;

supplying said wheel signals to the control device as input information; and said control device generating signals for controlling actuation of individual brake units assigned to individual vehicle wheels, at least as a function of said wheel signals as input information.

2. A method according to claim 1, wherein a reduced wheel reaction force at a particular wheel is compensated by a brake intervention such that a slip of the particular wheel is opposed.

3. A method according to claim 1, wherein wheel suspension travels or wheel reaction forces are determined by means of sensors.

4. A method according to claim 1, wherein wheel reaction forces are determined from the wheel suspension travels.

5. A method according to claim 1, wherein:

compression and rebounding rates are determined from time variations of the wheel suspension travels; and compression and rebounding rates are used as wheel signals.

6. A method according to claim 1, wherein:

wheel reaction force rates are determined from time variation of normal wheel forces; and wheel reaction force rates are used as wheel signals.

7. A method according to claim 1, wherein signals which indicate uphill or downhill driving are supplied as additional input quantities to the control device.

8. A method according to claim 7, wherein the signals indicating uphill or downhill driving also contain information concerning slope of a traveled surface.

9. A method according to claim 1, wherein signals which are indicative of lateral acceleration of the vehicle are supplied as additional input quantities to the control device.

10. A control system for automatic braking in an all-wheel-drive vehicle, having a control unit with signal inputs for receiving input information and signal outputs for controlling brake units for individual vehicle wheels, wherein:

said control unit processes wheel signals as input information, which wheel signals correspond to one of wheel suspension travels, wheel reaction forces and quantities derived therefrom; and said control unit generates signals for controlling the respective brake units for the individual vehicle wheels, at least as a function of the wheel signals.

11. Apparatus for controlling automatic braking in a vehicle having individually actuatable brake units for independent braking of respective vehicle wheels, said apparatus comprising:

an information processor coupled to receive input signal information from sensors on said vehicle indicative of one of wheel suspension travels and wheel reaction forces, and to supply actuation signals to said individually actuatable brake units;

wherein said information processor is programmed to generate said actuation signals as a function of at least one of said wheel suspension travels and said wheel reaction forces.

* * * * *